United States Patent
Zeckendorf et al.

(10) Patent No.: US 10,228,289 B2
(45) Date of Patent: Mar. 12, 2019

(54) DETECTING OCCUPANCY AND TEMPERATURE WITH TWO INFRARED ELEMENTS

(71) Applicant: Google Inc., Mountain View, CA (US)

(72) Inventors: Sam Zeckendorf, Mountain View, CA (US); Moyukh Chatterjee, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 413 days.

(21) Appl. No.: 15/154,466

(22) Filed: May 13, 2016

(65) Prior Publication Data

US 2017/0328777 A1  Nov. 16, 2017

(51) Int. Cl.
| | |
|---|---|
| *G01J 5/00* | (2006.01) |
| *G01K 1/00* | (2006.01) |
| *G01N 25/00* | (2006.01) |
| *G01J 5/10* | (2006.01) |
| *G01V 8/00* | (2006.01) |
| *G01J 5/34* | (2006.01) |

(Continued)

(52) U.S. Cl.
CPC .............. *G01J 5/10* (2013.01); *G01J 5/0025* (2013.01); *G01J 5/34* (2013.01); *G01V 8/00* (2013.01); *G08B 13/191* (2013.01); *G01J 2005/068* (2013.01); *G08B 13/08* (2013.01); *G08B 25/008* (2013.01); *H05B 37/0227* (2013.01)

(58) Field of Classification Search
USPC .................... 374/121, 208, 45, 112
See application file for complete search history.

(56) References Cited

U.S. PATENT DOCUMENTS

| | | | | |
|---|---|---|---|---|
| 5,877,688 A | * | 3/1999 | Morinaka | ............. G01S 7/4813 |
| | | | | 250/338.1 |
| 6,079,626 A | | 6/2000 | Hartman | |

(Continued)

OTHER PUBLICATIONS

MLX90614 Digital, plug & play, infrared thermometer in a TO-can., Melexis Microelectronic Integrated Systems, http://www.melexis.com/Infrared-Thermometer-Sensors/Infrared-Thermometer-Sensors/MLX90614-615.aspx (last visited Apr. 28, 2016)., 1 page.

(Continued)

*Primary Examiner* — Mirellys Jagan
(74) *Attorney, Agent, or Firm* — Morris & Kamlay LLP

(57) ABSTRACT

A device may include a first infrared sensor, a second infrared sensor, a temperature detecting component, and an occupancy detecting component. The first infrared sensor may connect to the temperature detecting component through a first temperature signal path and the occupancy detecting component through a first occupancy signal path. The second infrared sensor may connect to the temperature detecting component through a second temperature signal path and the occupancy detecting component through a second occupancy signal path. The temperature detecting component may determine a temperature measurement by calculating an average of a value received from the first temperature signal path and a value received from the second temperature signal path. The occupancy detecting component may determine an occupancy measurement by calculating a difference of the value received from the first occupancy signal path and the value received from the second occupancy signal path.

19 Claims, 9 Drawing Sheets

(51) Int. Cl.
*G08B 13/191* (2006.01)
*G08B 13/08* (2006.01)
*G08B 25/00* (2006.01)
*H05B 37/02* (2006.01)
*G01J 5/06* (2006.01)

(56) References Cited

U.S. PATENT DOCUMENTS

| | | | | |
|---|---|---|---|---|
| 7,541,924 | B2* | 6/2009 | Elwell | G08B 13/1627 |
| | | | | 340/426.26 |
| 8,378,820 | B2* | 2/2013 | Micko | G08B 13/191 |
| | | | | 340/545.3 |
| 9,095,013 | B2 | 7/2015 | Leinen et al. | |
| 2002/0145516 | A1* | 10/2002 | Moskowitz | B60H 1/00742 |
| | | | | 340/522 |
| 2004/0155783 | A1* | 8/2004 | Al-Sheikh | G08B 21/22 |
| | | | | 340/584 |
| 2007/0013531 | A1* | 1/2007 | Hules | B60R 25/1004 |
| | | | | 340/584 |
| 2008/0157985 | A1* | 7/2008 | Wilson | B60N 2/002 |
| | | | | 340/584 |
| 2008/0163670 | A1* | 7/2008 | Georgeson | G08B 31/00 |
| | | | | 73/23.31 |
| 2010/0201527 | A1* | 8/2010 | Jensen | G08B 13/193 |
| | | | | 340/584 |
| 2013/0107245 | A1 | 5/2013 | Covaro et al. | |
| 2013/0340500 | A1* | 12/2013 | Miller | G01N 25/56 |
| | | | | 73/29.02 |
| 2014/0314123 | A1 | 10/2014 | Schilz | |
| 2015/0120360 | A1 | 4/2015 | Adriaenssens | |
| 2015/0124853 | A1* | 5/2015 | Huppi | G01K 1/16 |
| | | | | 374/142 |
| 2015/0192471 | A1 | 7/2015 | Read | |

OTHER PUBLICATIONS

PIR Sensor (Rev B), Parallax Inc, https://www.parallax.com/product/555-28027 (last visited Apr. 28, 2016)., 3 pages.

How Infrared motion detector components work, Glolab Corporation, http://www.glolab.com/pirparts/infrared.html (last visited Apr. 28, 2016)., 4 pages.

Zmotion "Detection and Control Family Featuring PIR Technology", www.zilog.com, 2015, pp. 68.

Gruner, "Principles of Non-Contact Temperature Measurement", www.raytek.com, 2003, pp. 32.

Micro-Epsilon, "Basics of non contact temperature measurement", www.micro-epsilon.com, pp. 20.

Extended European Search Report dated Sep. 26, 2017 for EP17170240-0, 8 pages.

* cited by examiner

DETECTING OCCUPANCY AND TEMPERATURE WITH TWO INFRARED ELEMENTS

BACKGROUND

Passive infrared (PIR) sensors can been incorporated into various household items. For example a PIR sensor can be configured as an occupancy sensor and connected to a light fixture in a room. When an occupant enters the room, the PIR sensor may detect the occupant and trigger the light fixture to activate so that the occupant will be able to see. A PIR sensor can also be configured as a temperature sensor for monitoring systems in the home. For example a PIR sensor can be installed such that it is directed at an air vent to monitor the efficiency of a heating ventilation and air conditioning (HVAC) system. In applications such as these, the occupancy sensors or temperature sensors are typically stand-alone devices with single purpose functionality.

SUMMARY

In accordance with an embodiment of the disclosure, a device may include a first infrared sensor and a second infrared sensor distinct from the first infrared sensor. The device may include a first detection component, a first temperature signal path connecting the first detection component and the first infrared sensor, and a second temperature signal path connecting the first detection component and the second infrared sensor. The device may include a second detection component, a first occupancy signal path connecting the second detection component and the first infrared sensor, and a second occupancy signal path connecting the second detection component and the second infrared sensor.

In accordance with an embodiment of the disclosure, a system may include a first infrared sensor, a second infrared sensor distinct from the first infrared sensor, a processor in communication with the first infrared sensor and the second infrared sensor, and a non-transitory, computer-readable medium in communication with the processor. The non-transitory, computer-readable medium may store instructions that, when executed by the processor, cause the processor to perform operations. The operations may include receiving, from the first infrared sensor, a first signal; receiving, from the second infrared sensor, a second signal; determining based on the first signal and the second signal, a temperature measurement; and determining, based on the first signal and the second signal, an occupancy measurement.

In accordance with an implementation of the disclosure, a first infrared sensor housed in a device may capture a first incident radiation, and a second infrared sensor that is housed in the device and that is distinct from the first infrared sensor, may capture a second incident radiation. The first infrared sensor may generate a first signal in response to the first incident radiation. The second infrared sensor may generate a second signal in response to the second incident radiation. The device may determine a temperature measurement based on the first signal and the second signal and may determine an occupancy measurement based on the first signal and the second signal.

In accordance with an embodiment of the disclosure a first means may be provided for capturing a first incident infrared radiation and a second means may be provided for capturing a second incident infrared radiation. A means may be provided for determining a temperature measurement. A means may be provided for connecting the temperature measurement means with the first incident radiation capture means, and a means may be provided for connecting the temperature measurement means with the second incident radiation capture means. A means may be provided for determining an occupancy measurement. A means may be provided for connecting the occupancy measurement means with the first incident radiation capture means, and a means may be provided for connecting the occupancy measurement means with the second incident radiation capture means.

Features, advantages, implementations, and embodiments of the disclosure may be apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide further understanding of this disclosure, are incorporated in and constitute a part of this specification. The drawings also illustrate implementations and/or embodiments of the disclosure, and together with the detailed description serve to explain the principles of implementations and/or embodiments of the disclosure. No attempt is made to show structural details in more detail than may be necessary for a fundamental understanding of the disclosure and various ways in which it may be practiced.

DETAILED DESCRIPTION

Figure 1:
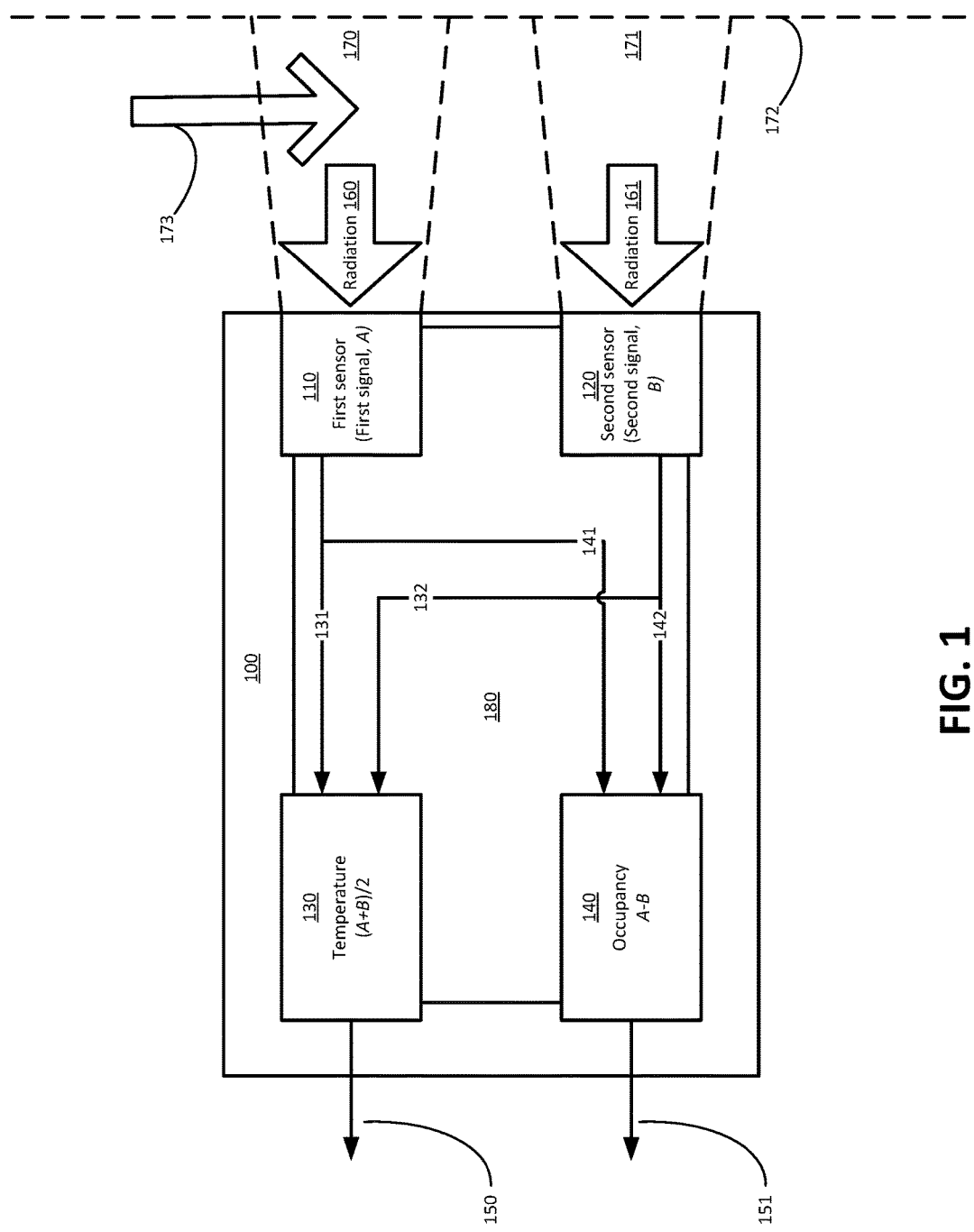
FIG. 1 shows a system diagram of a sensor device for determining temperature and occupancy according to an embodiment of this disclosure.

There is an increasing need to reduce the size of electronic devices incorporated into premises management systems. For example, occupancy sensors are often integrated into compact housings so that they can be more easily incorporated into the home environment. Many temperature sensors detect temperature at close proximity to the sensor itself. Measurements from such sensors may be distorted by the local temperature of the device housing the sensor and thus not accurately reflect the broader temperature in the room where the sensor is located. Incorporating both conventional occupancy and conventional temperature sensors into a component of a premises management system can require multiple circuit boards and detection components. This can result in increased size of the device and/or inaccurate measurements from the temperature sensor due to heating from the combined device.

To address these and other issues, embodiments of this disclosure may include a device that detects both temperature and occupancy using two infrared sensors. This infrared, multi-sensor device may have a first infrared sensor, a second infrared sensor, a temperature detection component, and an occupancy detection component. The temperature detection component may connect to the first infrared sensor through a first temperature signal path and connect to the second infrared sensor through a second temperature signal path. The occupancy detection component may connect to the first infrared sensor through a first occupancy signal path and connect to the second infrared sensor through a second occupancy signal path. The temperature detection component may average a value of a signal received from the first temperature signal path and a value of a signal received from the second temperature signal path to provide a temperature measurement. The occupancy detection component may calculate a difference between the value of the signal received from the first occupancy signal path and the value of the signal received from the second occupancy signal path to provide an occupancy measurement. The infrared, multi-sensor device may communicate the temperature measurement and occupancy measurement to other systems remote from the device.

Generally, embodiments and implementations of this disclosure may be partially or completely incorporated within a "smart home environment", such as is described in later portions of this disclosure. The smart home environment may include systems such as premises management systems that may include or communicate with various intelligent, multi-sensing, network-connected devices, such as the infrared, multi-sensor devices described herein. Devices included within the smart home environment, such as any of the sensor devices and related components described below with respect to FIGS. 5A-7B, may integrate seamlessly with each other and/or with a central server or cloud-computing system. By incorporating and/or communicating with such components, the smart home environment may provide home automation and related functionality. For example, premises management systems may provide functionality such as home security, temperature control, lighting control, sound control, home appliance control, entertainment system control, home robot control, fire detection and suppression, hazardous substance detection and suppression, health monitoring, sleep monitoring, pet and plant management, or any other functionality suitable for the purposes of this disclosure.

An infrared, multi-sensing device may include a first infrared sensor and a second infrared sensor, distinct from the first infrared sensor. For example, FIG. 1 shows a system diagram of a device 100 according to an embodiment of this disclosure. The device 100 may include a first infrared sensor 110 and second infrared sensor 120. Each infrared sensor 110, 120 may be a PIR sensor contained inside, integrated with, or disposed on a housing of device 100. Each infrared sensor 110, 120 may have a sensor face directed at an area of a room where occupants are expected to travel. The room may have surfaces such as surface 172 from which infrared radiation such as infrared radiation 160, 161 may be emitted. Each sensor may include elements composed of pyroelectric material, such as gallium nitride, caesium nitrate, polyvinyl fluorides, derivatives of phenylpyridine, cobalt phthalocyanine, other similar materials commonly used in PIR sensors, or any other material that generates energy when exposed to infrared energy and that is suitable for the purposes of the disclosure. In some embodiments the first and second infrared sensors 110, 120 may each include separate elements of pyroelectric material and separate output paths, while sharing other components within a single device. Thus an infrared sensor may include only an element of pyroelectric material, or an infrared sensor may include an element of pyroelectric material along with one or more other components such as signal paths, detecting components, and other components discussed herein.

In embodiments of this disclosure, an infrared sensor may include infrared-sensing components other than or in place of pyroelectric materials. For example, thermocouple elements may be employed, such as bismuth or antimony elements; bolometers may be employed, such as arrays made of vanadium oxide or amorphous silicon; or quantum detectors may be employed that include materials that release electrons in response to incident photons.

Incident radiation 160 may be captured by first infrared sensor 110 and incident radiation 161 may be captured by second infrared sensor 120. For example a lens (not shown), such as a Fresnel lens, may be positioned on device 100 between incident radiation 160 and first infrared sensor 110. The lens may receive incident radiation from the environment where device 100 is located and focus the radiation onto first infrared sensor 110. Pyroelectric material contained in first infrared sensor 110 may be sensitive to a wide range of radiation wavelengths, and thus it may be beneficial for a filter (not shown) to be positioned between the lens and the pyroelectric material to filter out certain wavelengths. For example, the filter may only allow wavelengths between 5-15 millimeters to reach the pyroelectric material. This wavelength range may filter out radiation not consistent with infrared radiation emitted by human occupants, which may be beneficial for detecting occupancy. A single lens and single filter may focus and filter incident radiation for both the first infrared sensor 110 and the second infrared sensor 120, or the first infrared sensor 110 may have lens and filter components and, the second infrared sensor 120 may have distinct lens and filter components.

The interaction of incident radiation with first infrared sensor 110 and second infrared sensor 120 may generate a signal that travels to other components of device 100. For example, changes in the energy of incident radiation 160 and/or incident radiation 161 may result in a change in the charge generated by pyroelectric material contained in first infrared sensor 110 and/or second infrared sensor 120 and thereby generate a voltage change. This voltage may travel as a signal through the signal paths to temperature detecting component 130 and occupancy detecting component 140. A first temperature signal path 131 may connect the temperature detecting component 130 to the first infrared sensor 110. A first occupancy signal path 141 may connect the occupancy detecting component 140 to the first infrared sensor 110. Similarly, a second temperature signal path 132 may connect the temperature detecting component 130 to the second infrared sensor 120, and a second occupancy signal path 142 may connect the occupancy detecting component 140 to the second infrared sensor 120.

The first temperature signal path 131 and the first occupancy signal path 141 may combine into a single signal path before connecting to the first infrared sensor, and the second temperature signal path 132 and the second occupancy signal path 142 may combine into a single signal path before connecting to the second infrared sensor. Any of signal paths 131, 132, 141, 142 may travel through an amplifier before reaching temperature detecting component 130, occupancy detecting component 140, and/or other components of this disclosure. The amplifier may increase the amplitude of the signals to enable more accurate calculations or processing by detecting components 130, 140, and/or other components of this disclosure, such as a controller.

A particular signal, such as a first signal or a second signal, may exit first infrared sensor 110 or second infrared sensor 120 and split between two signal paths. The component of the first signal on each signal path may each individually be deemed to be the first signal or each may be deemed to be the second signal. For example, a first signal having a value of 5 volts may exit first infrared sensor 110 and split into two 2.5 volt signals, one traveling through temperature signal path 131 and the other traveling through occupancy signal path 141. When the first 2.5 volt signal reaches temperature detecting component 130 and the second 2.5 volt signal reaches occupancy detecting component 140, each detecting component 130, 140 may be deemed to have received the first signal. Each detecting component, 130, 140 may also make determinations and/or calculations using the first signal substantially concurrently, or at least in part concurrently. In some embodiments, amplifiers may increase the voltage of signals traveling on signal paths 131, 132, 141, and 142 such that, for example, the 2.5 volt signals described above are each returned to 5 volt signals before reaching detecting components 130, 140.

Signal paths 131, 132, 141, and 142 may each be printed or otherwise disposed on electronic circuit board 180. Circuit board 180 may also be connected to infrared sensor 110, 120 and detecting components 130, 140. A single circuit board may be beneficial to reduce the size of device 100 and enable a variety of options for integration into objects within a premises, such as objects incorporated into the smart home environment.

The temperature detecting component 130 may include any suitable combination of hardware and software for calculating the average of a value of a signal from first temperature signal path 131 and a value of a signal from second temperature signal path 132. For example, the temperature detecting component 130 may receive a value A from first temperature signal path 131 and a value B from second temperature signal path 132. The value A and value B may be, for example, voltages, energies, quantities of charge, or other characteristics of an electric signal generated by the interaction of incident radiation with infrared sensors 110 or 120. Temperature detecting component 130 may add the value A and the value B and then divide the sum by the value 2. The average value may then travel as a signal from temperature detecting component 130 via output path 150. In some embodiments the average value may be calculated by other processes, such as by passing the signals having values A and B through an averaging circuit. Calculating the average value may be beneficial to reduce the influence of a distorted signal from one of the infrared sensors, such as when a surface having low emissivity of infrared radiation is temporarily within field of view 170 of the first infrared sensor 110 or second infrared sensor 120.

The occupancy detecting component 140 may include any suitable combination of hardware and software for calculating the difference of a value of a signal from first occupancy signal path 141 and a value of a signal from second occupancy signal path 142. For example, occupancy detecting component 140 may receive a value A from first occupancy signal path 141 and a value B from second occupancy signal path 142. Occupancy detecting component 140 may subtract the value B from the value A, resulting in a difference value. The difference value may travel as a signal from occupancy detecting component 140 via output path 151. In some embodiments, occupancy detecting component 140 may divide the difference value by the value 2 before it travels via output path 151. Output paths 150 and 151 may be printed or otherwise disposed on an electronic circuit board, such as circuit board 180.

Calculating the difference value may be beneficial when detecting occupancy. A large difference value may indicate that an object having a high emissivity of infrared radiation is within the field of view of one of the infrared sensors and not within the field of view of the other infrared sensor. For example, a large positive difference value may indicate that a high emissivity object 173 is within field of view 170 of first infrared sensor 110 because the relatively small value B may be subtracted from the relatively large value A. First infrared sensor 110 and second infrared sensor 120 may be arranged in a horizontal line, substantially parallel with the floor of the room device 100 is monitoring. Field of view 170 may overlap partially or may be distinct from field of view 171. Thus a large negative difference value detected after the large positive difference value may indicate the high emissivity object has travelled from field of view 170 of first infrared sensor 110 to field of view 171 of second infrared sensor 120. This may result because a relatively large value B may be subtracted from a relatively small value A. The wavelengths of incident radiation captured may be filtered to only allow for wavelengths corresponding to those typically emitted by a human. Thus detecting a high emissivity object by one infrared sensor and not the other infrared sensor may indicate the presence of a human occupant rather than a systematic, non-human event that affects both fields of view, 170, 171. Furthermore, a sequence of detection of a high emissivity object by one infrared sensor and then the other may indicate a direction of travel of the human. For example, detecting a large positive difference value by device 100 followed by a large negative difference value may indicate a human is walking from field of view 170 to field of view 171.

A threshold value may be predetermined, such as through empirical testing, and occupancy detecting component 140 may compare the difference value to the threshold value. If the difference value exceeds the threshold value, then occupancy detecting component may generate a signal having an occupancy value that may travel via output path 151. For example a gate in the circuitry of occupancy detecting component 140 may permit the signal characterized by the difference value to reach output path 151. If the difference value does not exceed the threshold value, then the gate may not open and no occupancy value may be generated, or an occupancy value indicating no occupants may be generated and provided via output path 151.

Detecting components, such as temperature detecting component 130 and occupancy detecting component 140 may be distinct physical components or functions of a single physical component. For example, in some embodiments, signal paths 131, 132, 141, and 142 may each connect to a single physical component that performs functions including detecting temperature and occupancy. Detecting components may include circuitry such as signal paths, transistors, capacitors, resistors, inductors, and so forth. Input and output signals from detecting components may be analogue or digital signals In some embodiments, a detecting component may include an averaging circuit. An averaging circuit may include circuitry that connects multiple input signals and applies equal resistors to each, resulting in an output signal with a voltage that is the average of the voltages of the input signals. Thus for example, temperature detecting component 130 may include an averaging circuit that receives signals from signal paths 131,132 as inputs and outputs a signal with a voltage that is the average value of the values of the signals received from signal paths 131, 132.

In some embodiments, a detecting component may include a differential amplifier circuit. A differential amplifier circuit may include circuitry that connects two input signals and outputs a signal that is proportional to the difference between voltages of the two input signals. For example, occupancy detecting component 140 may include a differential amplifier circuit that takes as inputs, the signals from occupancy signal paths 141, 142. The output of the differential amplifier circuit may be a signal having a voltage that is the difference value between values of signals received from signal paths 141, 142.

In some embodiments, detecting components may include a comparator circuit that may compare an input value to a threshold value and output an output value. The input value, threshold value, and output value may each be voltages. The output value may be binary, such that it is either a voltage corresponding to a 1 or a voltage corresponding to a 0. If the input value exceeds the threshold value, then the comparator circuit may output a voltage corresponding to 1, and if the input value is less than the threshold value, then the comparator circuit may output a voltage corresponding to 0. Thus for example, occupancy detecting component 140 may include a comparator circuit that receives a signal from the differential amplifier circuit having a voltage that is the difference value. The comparator circuit may compare the difference value to a threshold value and determine that the threshold value has been exceeded. The comparator circuit may then output a signal having an occupancy value of 1 to other components, such as other components of device 100 or other components of the smart home environment. This output signal may indicate the detection of occupancy.

Figure 2:
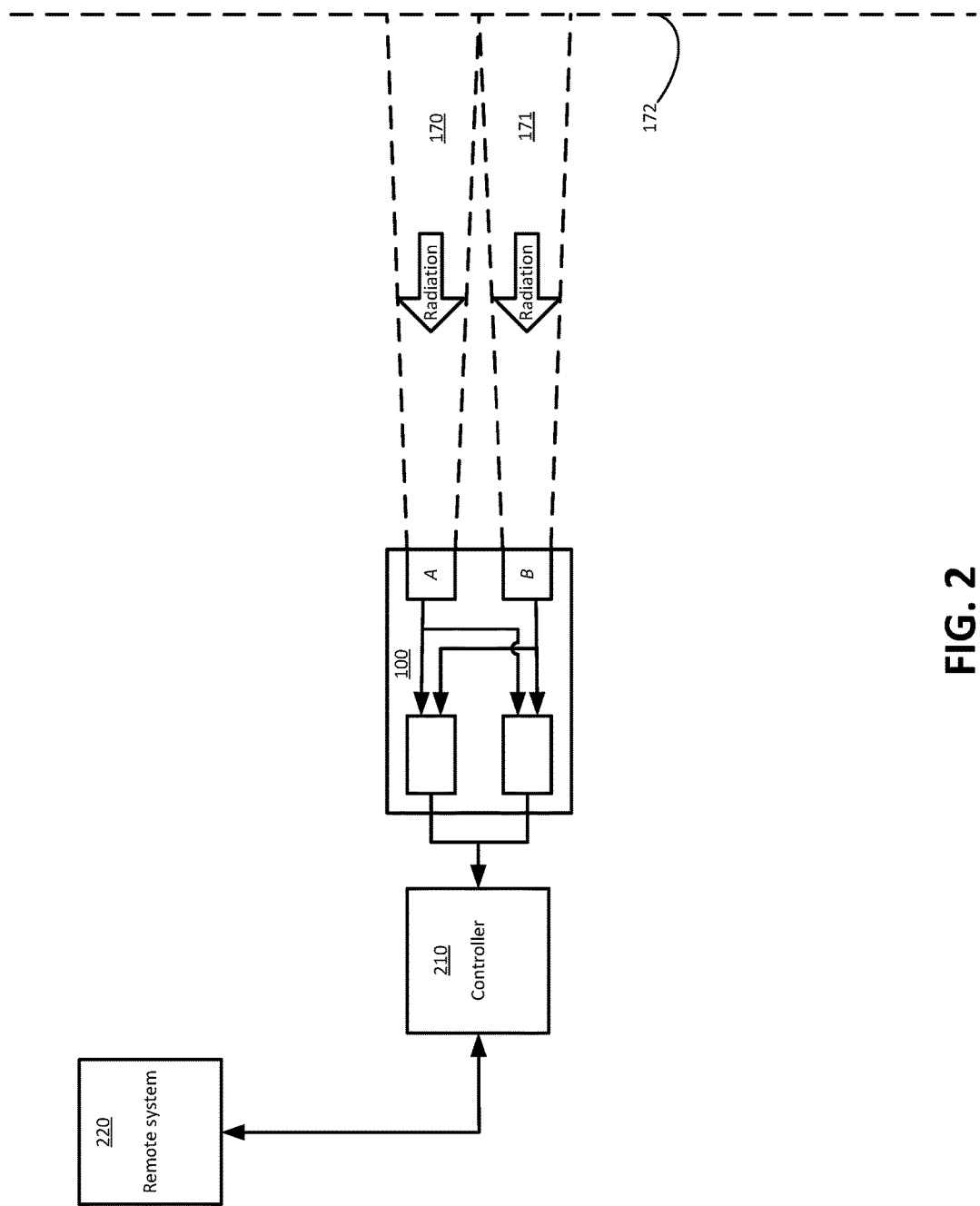
FIG. 2 shows a system diagram including a sensor device for determining temperature and occupancy according to an embodiment of this disclosure.

In some embodiments device 100 and/or components of device 100 may communicate with and/or be controlled by other components, including components remote from device 100. For example, FIG. 2 shows a system diagram according to an embodiment of the disclosure of device 100 in communication with controller 210 and remote system 220. Controller 210 may be any suitable combination of hardware and software for controlling components of device 100. For example controller 210 may be a microcontroller and/or a device such as a sensor, controller, or computing device described in later portions of this disclosure with respect to FIGS. 5A-5B, 7A-7B, and 8. Controller 210 may include components such as a processor, memory, an oscillator, analog-to-digital converter circuitry, digital-to-analog converter circuitry, a power supply, and encoded instructions for an application programming interface (API) to allow for the development of applications for device 100.

Controller 210 may control certain functionality of device 100 and/or components of device 100, such as determining temperature measurements, determining occupancy measurements, regulating power consumption, adjusting emissivity detection settings, adjusting threshold levels, adjusting the position and/or orientation of device 100, adjusting the position and/or orientation of the sensor faces of infrared sensors 110, 120, or communicating with other components of the smart home environment. Controller 210 may be contained in the same housing as device 100, installed on circuit board 180, or may be distinct from device 100 and connected by wired or wireless communications, such as Wi-Fi or cellular communications. For example, in some implementations, controller 210 may execute as software on one or more remote servers and/or in a cloud computing environment. In other implementations and embodiments, controller 210 may include detecting components 130, 140.

Remote system 220 may be any suitable combination of hardware and software for performing functions with or interacting with other components of the smart home environment. For example, remote system 220 may be a device such as the computing device, controller, or remote system described in later portions of this disclosure with respect to FIGS. 5A-5B, 7A-7B, 8, and 9. Remote system 220 may be a home monitoring hub that manages multiple devices in the smart home environment. For example, device 100 may provide an average value to controller 210 via an output path, such as output path 150. Controller 210 may receive the average value via output path 150 and compare the average value to a set of temperature measurements that have been predetermined to correspond to average values received from device 100. In other implementations, controller 210 may receive the average value and calculate a temperature measurement according to a predetermined formula configured for device 100.

Controller 210 may determine a temperature measurement and provide an indicator representing the temperature measurement to remote system 220. For example, controller 210 may transmit an indicator of the temperature measurement to remote system 220 via a wireless radio in communication with controller 210. Remote system 210 may compare the received temperature measurement to a preconfigured temperature preference for the room in which device 100 is located. If the received temperature measurement is outside of the preferred temperature range, then remote system 210 may transmit an instruction to a HVAC system to increase or decrease the air temperature to compensate for the temperature measurement. Remote system 220 may be located within the same room as device 100, outside of the room but within the same premises as device 100, or outside of the premises, such as where remote system 220 is implemented on one or more servers and/or in a cloud computing environment in communication with controller 210.

Figure 3:
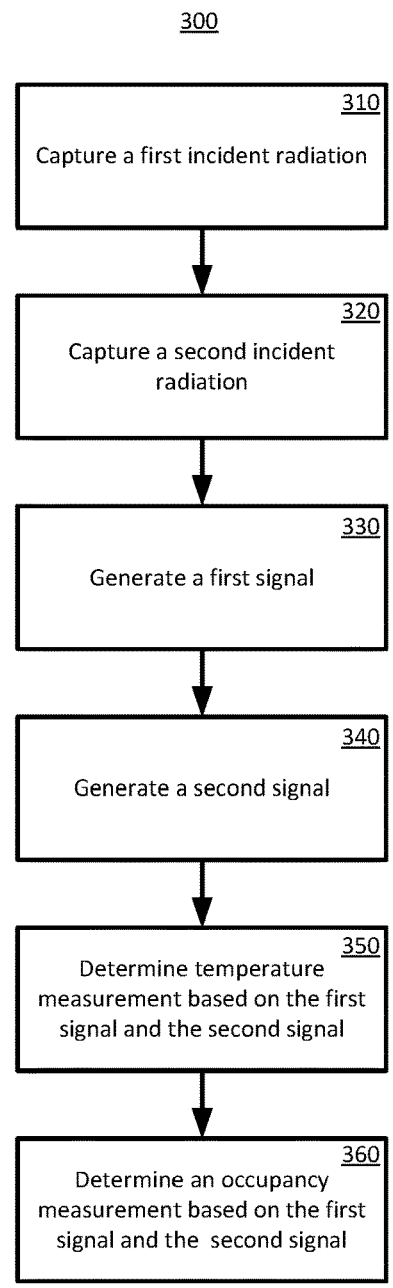
FIG. 3 shows a procedure for determining temperature and occupancy according to an implementation of this disclosure.

Device 100 and systems and components in communication with device 100 may provide a variety of functionality. For example, a first infrared sensor and a second infrared sensor, such as those of device 100, may be in communication with a processor and a non-transitory, computer-readable storage medium. The non-transitory, computer-readable storage medium may store instructions, that when executed by the processor, cause the processor to perform a procedure that determines the temperature and occupancy of an area of a room of a premises. FIG. 3 shows an example procedure for detecting the temperature and occupancy of an area of a room according to an implementation of this disclosure. At 310, a first infrared sensor may capture a first infrared radiation, and at 320 a second infrared sensor may capture a second infrared radiation. The first infrared sensor may be distinct from the second infrared sensor, and both the first and second infrared sensors may be housed in a device, such as device 100. At 330, a first signal may be generated by the first infrared sensor in response to the first infrared radiation, and at 340, a second signal may be generated by the second infrared sensor in response to the second infrared radiation. At 350 a temperature measurement may be determined based on the first signal and the second signal, and at 360 an occupancy measurement may be determined based on the first signal and the second signal.

In an example, a temperature detecting component may receive the first signal and the second signal and calculate an average value by summing a value of the first signal and a value of the second signal and dividing the sum by two. An occupancy detecting component may receive the first signal and second signal and calculate a difference value by subtracting a value of the first signal from a value of the second signal or a subtracting a value of the second signal from a value of the first signal. The average value may be sent to a controller that compares the average value to a set of temperature measurements corresponding to signal values. The controller may determine the temperature measurement that is closest to the average value and transmit this temperature measurement to a remote system. The difference value may be sent to the controller, and the controller may compare the difference value to a threshold value. If the difference value exceeds the threshold value, then the controller may determine there is an occupant present and transmit an indicator of the occupant to the remote system. In some implementations, the temperature measurement and/or the occupancy measurement may provide to a display component, audio component, or other indicator on the housing of device 100, another component containing device 100, or other object in the premises, such as a component of the smart home environment.

Continuing the example, the first signal and the second signal may each travel along separate signal paths, such as signal paths 131, 132, 141, 142 shown on device 100. Thus the first signal may travel to the temperature detecting component 130 via signal paths 131 and 141, and the second signal may travel to the occupancy detecting component 140 via signal paths 132 and 142. Thus, the temperature detecting component and the occupancy detecting component may receive the first signal and the second signal substantially concurrently or at least in part concurrently, and the determination of the temperature measurement and the determination of the occupancy measurement may occur substantially concurrently or at least in part concurrently.

Figure 4:
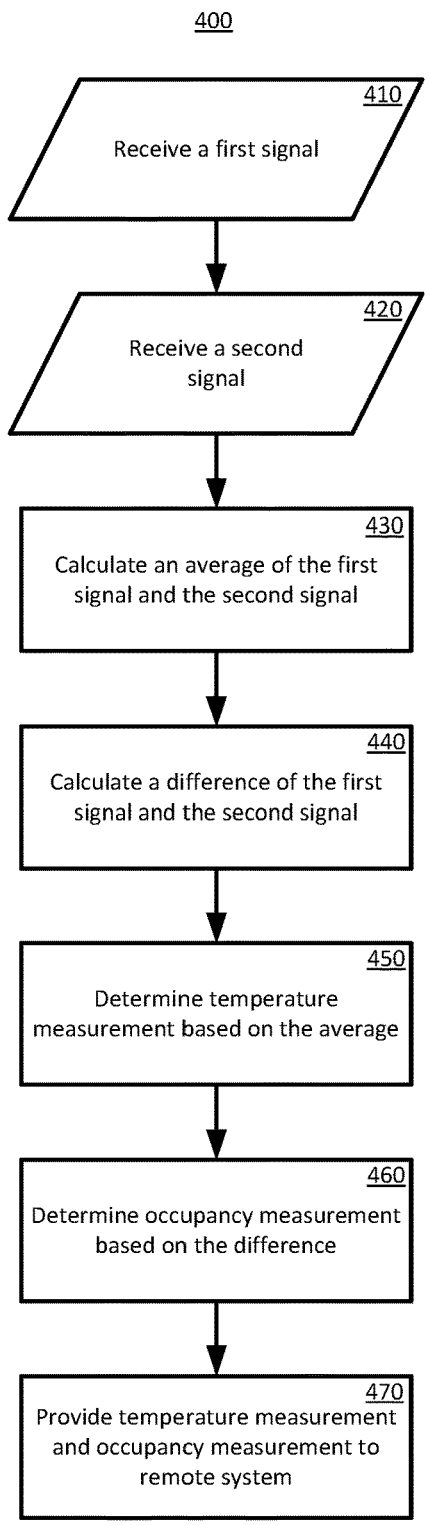
FIG. 4 shows a procedure for determining temperature and occupancy according to an implementation of this disclosure.

In an implementation, the first signal and second signal may travel directly to the controller 210 without first traveling to the temperature detecting component 130 or the occupancy detecting component 140, or the temperature detecting component 130 and/or the occupancy detecting component 140 may be implemented on controller 210. For example, FIG. 4 shows, a procedure 400 for determining an occupancy measurement and a temperature measurement according to an implementation of this disclosure. At 410 a first signal may be received from a first infrared sensor and at 420 a second signal may be received from a second infrared sensor. At 430 an average of a value of the first signal and a value of the second signal may be calculated. At 440 a difference between the value of the first signal and the value of the second signal may be calculated. At 450, a temperature measurement may be determined based on the average value. For example, the average value may be compared to a list of temperature values predetermined to correspond to values from the first infrared sensor and/or second infrared sensor. The closest temperature value to the average value may be returned as the temperature measurement. In another example, the temperature measurement may be calculated according to a predetermined formula that translates signal values into temperature measurements, such as calculations use commonly on commercial heat guns, thermal imaging software and devices, or other contactless temperature measurement devices. At 460 an occupancy measurement may be determined based on the difference value. For example, the difference value may be compared to a threshold value. If the difference value exceeds the threshold value then an occupancy measurement may be returned indicating the presence of an occupant. If the difference value does not exceed the threshold value, then an occupancy measurement may be returned indicating the absence of an occupant. At 470 the temperature measurement and the occupancy measurement may be provided to a remote system. For example, a wireless transmitter in communication with a controller may transmit the temperature measurement and occupancy measurement to the remote system.

In some embodiments calculations necessary for the temperature and occupancy determinations may be executed completely on hardware incorporated on a sensor device, such temperature detecting component 130 and occupancy detecting component 140 of device 100. In some implementations temperature detecting component 130 and occupancy detecting component 140 may be implemented completely in software executing on a computing device, such as by operations performed by a processor in communication with a non-transitory, computer-readable storage medium of controller 210. In other implementations and embodiments, the calculations and determinations necessary for the temperature and occupancy determinations may be executed in part on hardware incorporated on a sensor device and in part in software executing on a computing device. In some embodiments, controller 210 may be a stand-alone device in communication with infrared sensors by wired or wireless communications. In other implementations controller 210 may be incorporated into a single housing containing infrared sensors, signal paths, and detecting components, such as those shown in device 100.

Sensor devices, such as device 100, may communicate with other components of the smart home environment to provide complex functionality. For example, a remote system, such as a premises management system may control an alarm system within a home. The alarm system may be activated when all occupants are detected to be away from the home. For example, indicators such as global positioning system (GPS), cellular, or geofencing location identifiers of each occupant's mobile device may indicate each occupant is located outside of the home. In response to determining the occupants are away, the premises management system may activate alarms that are triggered when occupancy is detected in the home. A sensor device, such as device 100 may be incorporated into an object of the home such as a ceiling fan, lamp, electrical receptacle, or architectural features of a wall. Device 100 may detect occupancy in accordance with any of the procedures, systems, or devices described herein and provide an indicator of the occupancy to the premises management system. In response, the premises management system may perform operations such as activate an alarm, provide a notice to the occupants, or alert a security service.

The devices, systems, and procedures set forth in this disclosure may be in communication with other devices, systems, and procedures throughout a premises. Combined these devices, systems, and procedures may make up the greater smart home environment for the premises. Further aspects of the smart home environment and related components are discussed in the following portions of this disclosure.

In general, a "sensor" as disclosed herein may include multiple sensors or sub-sensors, such as a position sensor that includes both a GPS sensor as well as a wireless network sensor. This combination may provide data that can be correlated with known wireless networks to obtain location information. Multiple sensors may be arranged in a single physical housing, such as where a single device includes movement, temperature, magnetic, and/or other sensors, as well as the devices discussed in earlier portions of this disclosure. Such a housing also may be referred to as a sensor or a sensor device. For clarity, sensors are described with respect to the particular functions they perform and/or the particular physical hardware used, when such specification is necessary for understanding of the embodiments disclosed herein.

Figure 5A:
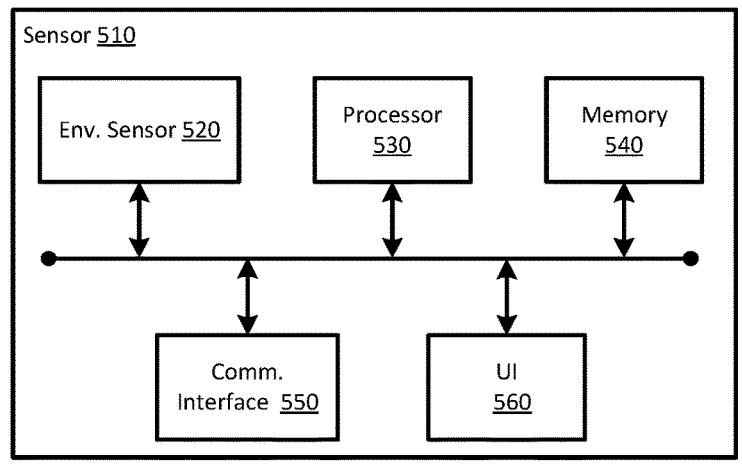
FIG. 5a shows a sensor according to an implementation of this disclosure.

A sensor may include hardware in addition to the specific physical sensor that obtains information about the environment. FIG. 5A shows an example sensor as disclosed herein. The sensor 510 may include an environmental sensor 520, such as a temperature sensor, smoke sensor, carbon monoxide sensor, motion sensor, accelerometer, proximity sensor, passive infrared sensor, such as any of the devices discussed in earlier portions of this disclosure, magnetic field sensor, radio frequency (RF) sensor, light sensor, humidity sensor, pressure sensor, microphone, or any other suitable environmental sensor, that obtains a corresponding type of information about the environment in which the sensor 510 is located. A processor 530 may receive and analyze data obtained by the sensor 510, control operation of other components of the sensor 510, and process communication between the sensor and other devices. The processor 530 may execute instructions stored on a computer-readable memory 540. The memory 540 or another memory in the sensor 510 may also store environmental data obtained by the sensor 510. A communication interface 550, such as a Wi-Fi or other wireless interface, Ethernet or other local network interface, or the like may allow for communication by the sensor 510 with other devices. A user interface (UI) 560 may provide information and/or receive input from a user of the sensor. The UI 560 may include, for example, a speaker to output an audible alarm when an event is detected by the sensor 510. Alternatively, or in addition, the UI 560 may include a light to be activated when an event is detected by the sensor 510. The user interface may be relatively minimal, such as a liquid crystal display (LCD), light emitting diode (LED) display, or limited-output display, or it may be a full-featured interface such as a touchscreen. Components within the sensor 510 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Figure 5B:
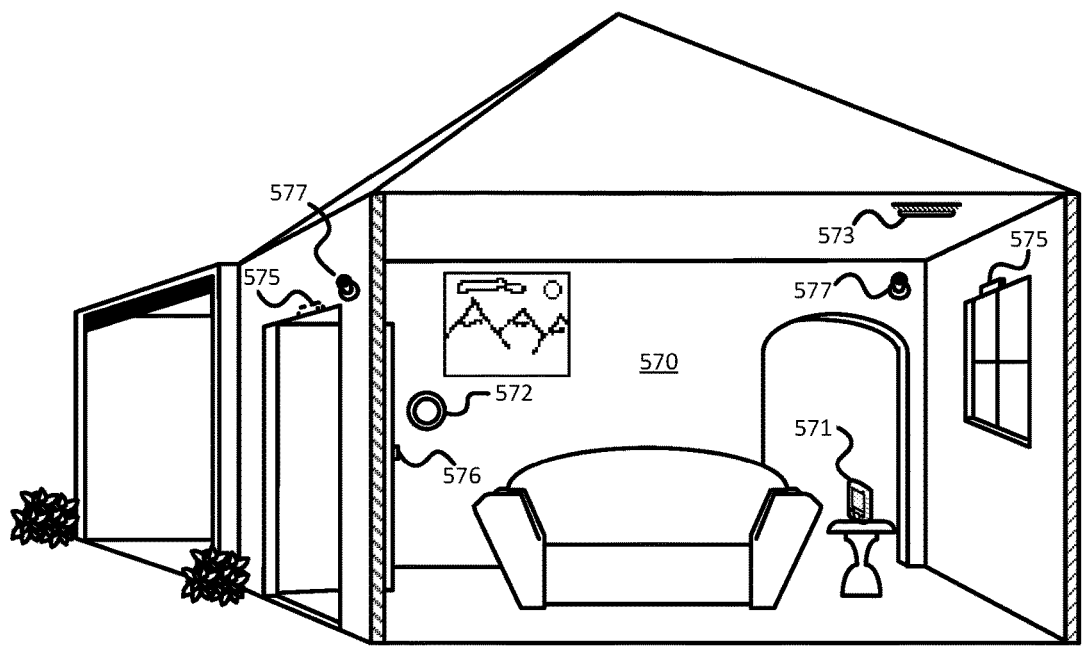
FIG. 5b shows a premises according to an implementation of this disclosure.

As an example of the implementation of sensors within a premises FIG. 5B depicts, one or more sensors implemented in a home premises 570 as part of a smart home environment. The smart home environment may include multiple types of home automation devices, such as one or more intelligent, multi-sensing, network-connected thermostats 572, one or more intelligent, multi-sensing, network-connected poisonous gas detection units 573, one or more intelligent, multi-sensing, network-connected entry detection units 575, one or more intelligent, multi-sensing, network-connected door handles 576, and one or more intelligent, multi-sensing, network-connected imaging sensors 577. Mobile device 571, such as a smart phone or tablet, may also be in communication with components of the smart home environment.

In some configurations, two or more sensors may generate data that can be used by a processor of a system to generate a response and/or infer a state of the environment. For example, an ambient light sensor in a room may determine that the room is dark (e.g., less than 60 lux). A microphone in the room may detect a sound above a set threshold, such as 60 dB. The system processor may determine, based on the data generated by both sensors, that it should activate one or more lights in the room. In the event the processor only received data from the ambient light sensor, the system may not have any basis to alter the state of the lighting in the room. Similarly, if the processor only received data from the microphone, the system may lack sufficient data to determine whether activating the lights in the room is necessary, for example, during the day the room may already be bright or during the night the lights may already be on. As another example, two or more sensors may communicate with one another. Thus, data generated by multiple sensors simultaneously or nearly simultaneously may be used to determine a state of an environment and, based on the determined state, generate a response.

Figure 6A:
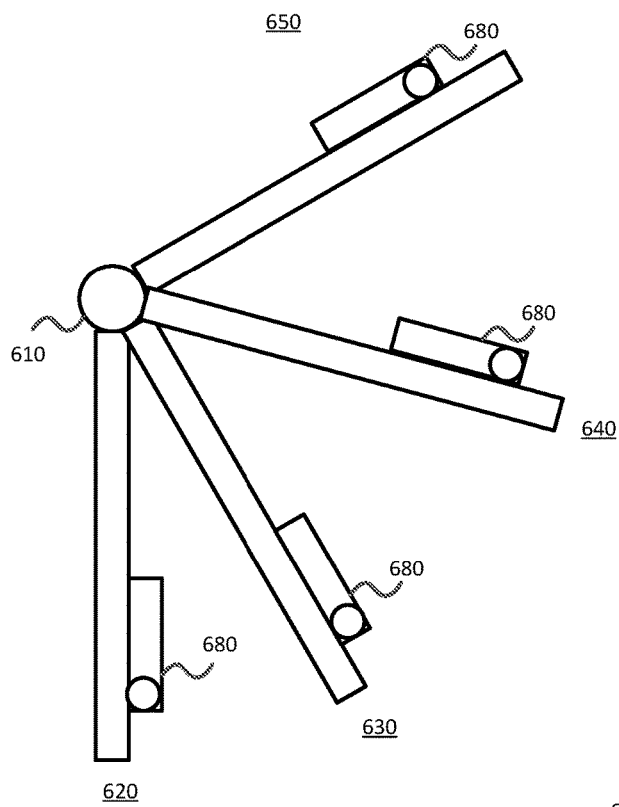
FIG. 6a shows a sensor according to an implementation of this disclosure.

As another example, a system may employ a magnetometer affixed to a door jamb and a magnet affixed to the door. When the door is closed, the magnetometer may detect the magnetic field emanating from the magnet. If the door is opened, the increased distance may cause the magnetic field near the magnetometer to be too weak to be detected by the magnetometer. If the system is activated, it may interpret such non-detection as the door being ajar or open. In some configurations, a separate sensor or a sensor integrated into one or more of the magnetometer and/or magnet may be incorporated to provide data regarding the status of the door. For example, an accelerometer and/or a compass may be affixed to the door and indicate the status of the door and/or augment the data provided by the magnetometer. FIG. 6A shows a schematic representation of an example of a door that opens by a hinge mechanism 610. In the first position 620, the door is closed and the compass 680 may indicate a first direction. The door may be opened at a variety of positions as shown 630, 640, and 650. The fourth position 650 may represent the maximum amount the door can be opened. Based on the compass 680 readings, the position of the door may be determined and/or distinguished more specifically than merely open or closed. In the second position 630, for example, the door may not be far enough apart for a person to enter the home. A compass or similar sensor may be used in conjunction with a magnet, such as to more precisely determine a distance from the magnet, or it may be used alone and provide environmental information based on the ambient magnetic field, as with a conventional compass.

Figure 6B:
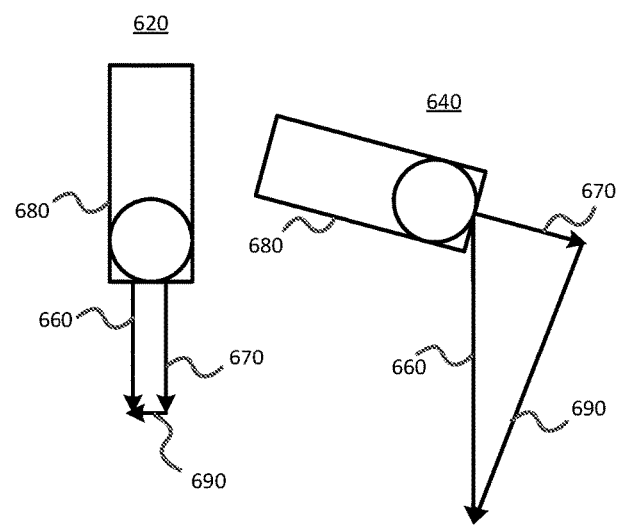
FIG. 6b shows a sensor according to an implementation of this disclosure.

FIG. 6B shows a compass 680 in two different positions, 620 and 640, from FIG. 6A. In the first position 620, the compass detects a first direction 660. The compass's direction is indicated as 670, and it may be a known distance from a particular location. For example, when affixed to a door, the compass may automatically determine the distance from the door jamb or a user may input a distance from the door jamb. The distance 660 representing how far away from the door jamb the door is may be computed by a variety of trigonometric formulas. In the first position 620, the door is indicated as not being separate from the door jamb (i.e., closed). Although features 660 and 670 are shown as distinct in FIG. 6B, they may overlap entirely. In the second position 640, the distance 690 between the door jamb and the door may indicate that the door has been opened wide enough that a person may enter. Thus, the sensors may be integrated into a home system, mesh network, or work in combination with other sensors positioned in and/or around an environment.

In some configurations, an accelerometer may be employed to indicate how quickly the door is moving. For example, the door may be lightly moving due to a breeze. This may be contrasted with a rapid movement due to a person swinging the door open. The data generated by the compass, accelerometer, and/or magnetometer may be analyzed and/or provided to a central system such as a controller 730 and/or remote system 740 depicted in FIG. 7A. The data may be analyzed to learn a user behavior, an environment state, and/or as a component of a smart home system. While the above example is described in the context of a door, a person having ordinary skill in the art will appreciate the applicability of the disclosed subject matter to other implementations such as a window, garage door, fireplace doors, vehicle windows/doors, faucet positions (e.g., an outdoor spigot), a gate, seating position, other openings, etc.

The data collected from one or more sensors may be used to determine the physical status and/or occupancy status of a premises, for example whether one or more family members are home or away. For example, open/close sensors such as door sensors as described with respect to FIGS. 6A and 6B may be used to determine that an unknown person has entered the premises. The system may first determine that a person has entered the premises due to sensors detecting a door opening and closing in a time span previously determined to be consistent with a person entering or leaving the premises. The system next may identify the person as "unknown" due to the absence of a smartphone, key fob, wearable device, or other device typically used to identify occupants of the premises. Continuing the example, sensor data may be received indicating that a valuable item within the premises has been moved, or that a component of the smart home environment associated with security functions such as a controller disclosed herein, has been moved or damaged. Such sensor data may be received, for example, from a sensor attached to or otherwise associated with the valuable item, from the smart home component itself, or from one or more other sensors within the smart home environment. In response, the system may generate an alert indicating that an unknown person has entered the premises and/or that the item or component has been moved or damaged. The system may further determine that an occupant of the home is close by but not present in the premises, for example based upon a Wi-Fi signal received from the occupant's smartphone, but an absence of near-field or other short-range communication from the same smartphone. In this case, the system may be configured to send the alert to the occupant's smartphone, such as via SMS, email, or other communication. As another example, the system may determine that the premises is already in an "away" state and that no occupants are nearby or expected to return in the near future. In this case, the system may be configured to send the alert to a local law enforcement agency, such as via email, SMS, recorded phone call, or the like.

Data generated by one or more sensors may indicate patterns in the behavior of one or more users and/or an environment state over time, and thus may be used to "learn" such characteristics. For example, sequences of patterns of radiation may be collected by a capture component of a device in a room of a premises and used as a basis to learn object characteristics of a user, pets, furniture, plants, and other objects in the room. These object characteristics may make up a room profile of the room and may be used to make determinations about objects detected in the room.

In another example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 pm, and then declines until another approximate time or time period, such as 5:30 pm, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 pm, an occupant is turning on/off a light as the occupant of the room in which the sensor is located enters/leaves the room. At other times, the light sensor data may indicate that no lights are turned on/off in the room. The system, therefore, may learn occupants' patterns of turning on and off lights, and may generate a response to the learned behavior. For example, at 5:30 pm, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Such learning behavior may be implemented in accordance with the techniques disclosed herein. For example, a smart home environment as disclosed herein may be configured to learn appropriate notices to generate or other actions to take in response to a determination that a notice should be generated, and/or appropriate recipients of a particular notice or type of notice. As a specific example, a smart home environment may determine that after a notice has been sent to a first occupant of the smart home premises indicating that a window in a room has been left open, a second occupant is always detected in the room within a threshold time period, and the window is closed shortly thereafter. After making such a determination, in future occurrences the notice may be sent to the second occupant or to both occupants for the purposes of improving the efficacy of the notice. In an embodiment, such "learned" behaviors may be reviewed, overridden, modified, or the like by a user of the system, such as via a computer-provided interface to a smart home environment as disclosed herein.

Sensors, premises management systems, mobile devise, and related components as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 7A:
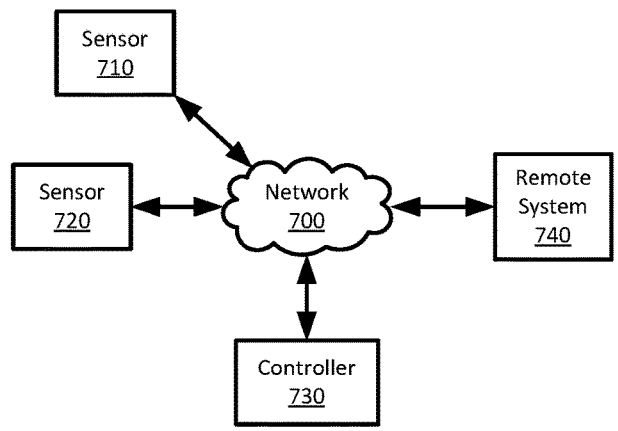
FIG. 7a shows networked sensors according to an implementation of this disclosure.
Figure 7B:
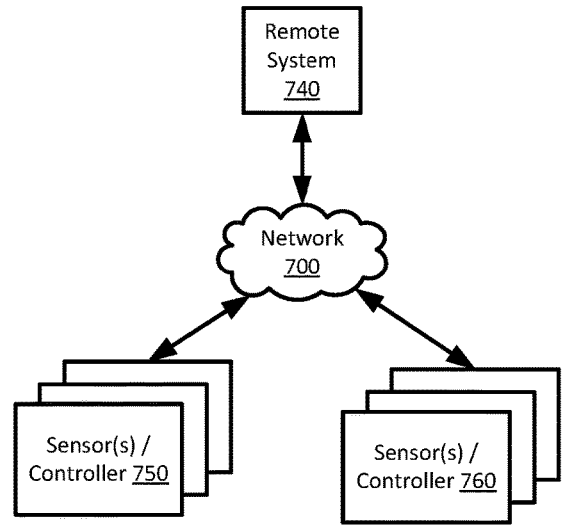
FIG. 7b shows networked sensors according to an implementation of this disclosure.

FIG. 7A shows an example of a sensor network as disclosed herein, which may be implemented over any suitable wired and/or wireless communication networks. One or more sensors 710 and 720 may communicate via a local network 700, such as a Wi-Fi or other suitable network, with each other and/or with a controller 730. The controller may be a general- or special-purpose computer. The controller may, for example, receive, aggregate, and/or analyze environmental information received from the sensors 710 and 720. The sensors 710 and 720 and the controller 730 may be located locally to one another, such as within a single dwelling, office space, building, room, or the like, or they may be remote from each other, such as where the controller 730 is implemented in a remote system 740 such as a cloud-based reporting and/or analysis system. Alternatively or in addition, sensors may communicate directly with a remote system 740. The remote system 740 may, for example, aggregate data from multiple locations, provide instruction, software updates, and/or aggregated data to a controller 730 and/or sensors 710, 720.

The devices of the disclosed subject matter may be communicatively connected via the network 700, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in methods and systems of the disclosed subject matter may avoid communication using a single device. That is, in the mesh-type network, such as network 700, there is no single point of communication that may fail so as to prohibit devices coupled to the network from communicating with one another.

The communication and network protocols used by the devices communicatively coupled to the network 700 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 700, may be easy to set up and secure to use. The network 700 may use an authentication scheme, such as AES (Advanced Encryption Standard) encryption or the like, to reduce and/or minimize security holes that exist in other wireless protocols. The Thread network may be scalable to connect devices (e.g., 2, 5, 10, 20, 50, 100, 310, 200, or more devices) into a single network supporting multiple hops (e.g., so as to provide communications between devices when one or more nodes of the network is not operating normally). The network 700, which may be a Thread network, may provide security at the network and application layers. One or more devices communicatively coupled to the network 700 (e.g., controller 730, remote system 740, and the like) may store product install codes to ensure only authorized devices can join the network 700. One or more operations and communications of network 700 may use cryptography, such as public-key cryptography.

The devices communicatively coupled to the network 700 of the smart home environment disclosed herein may have low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 700 may use the power-efficient IEEE 802.15.4 MAC/PHY protocol. In embodiments of the disclosed subject matter, short messaging between devices on the network 700 may conserve bandwidth and power. The routing protocol of the network 700 may reduce network overhead and latency. The communication interfaces of the devices coupled to the smart home environment may include wireless system-on-chips to support the low-power, secure, stable, and/or scalable communications network 700.

The sensor network shown in FIG. 7A may be an example of a smart home environment. The depicted smart home environment may include a structure, a house, office building, garage, mobile home, or the like. The devices of the smart home environment, such as the sensors 710 and 720 the controller 730, and the network 700 may be integrated into a smart home environment that does not include an entire structure, such as an apartment, condominium, or office space.

The smart home environment can control and/or be coupled to devices outside of the structure. For example, one or more of the sensors 710 and 720 may be located outside the structure, for example, at one or more distances from the structure (e.g., sensors 710 and 720 may be disposed outside the structure, at points along a land perimeter on which the structure is located, and the like. One or more of the devices in the smart home environment need not physically be within the structure. For example, the controller 730 which may receive input from the sensors 710 and 720 may be located outside of the structure.

The structure of the smart home environment may include a plurality of rooms, separated at least partly from each other via walls. The walls can include interior walls or exterior walls. Each room can further include a floor and a ceiling. Devices of the smart home environment, such as the sensors 710 and 720, may be mounted on, integrated with and/or supported by a wall, floor, or ceiling of the structure.

The smart home environment including the sensor network shown in FIG. 7A may include a plurality of devices, including intelligent, multi-sensing, network-connected devices, that can integrate seamlessly with each other and/or with a central server or a cloud-computing system (e.g., controller 730 and/or remote system 740) to provide home-security and smart home features. The smart home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 710 and 720 shown in FIG. 7A.

For example, a smart thermostat may detect ambient climate characteristics (e.g., temperature and/or humidity) and may accordingly control an HVAC system of the structure. For example, the ambient climate characteristics may be detected by sensors 710 and 720 shown in FIG. 7A, and the controller 730 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 710 and 720 shown in FIG. 7A, and the controller 730 may control an alarm system to provide a visual and/or audible alarm to the user of the smart home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 730.

In some embodiments, the smart home environment of the sensor network shown in FIG. 7A may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 710 and 720 shown in FIG. 7A. A smart wall switch may detect ambient lighting conditions, and control a power and/or dim state of one or more lights. For example, a sensor such as sensors 710 and 720, may detect ambient lighting conditions, and a device such as the controller 730 may control the power to one or more lights (not shown) in the smart home environment. Smart wall switches may also control a power state or speed of a fan, such as a ceiling fan. For example, sensors 710 and 720 may detect the power and/or speed of a fan, and the controller 730 may adjust the power and/or speed of the fan, accordingly. Smart wall plugs may control supply of power to one or more wall plugs (e.g., such that power is not supplied to the plug if nobody is detected to be within the smart home environment). For example, one of the smart wall plugs may control supply of power to a lamp (not shown).

In embodiments of the disclosed subject matter, a smart home environment may include one or more intelligent, multi-sensing, network-connected entry detectors (e.g., "smart entry detectors"). Such detectors may be or include one or more of the sensors 710 and 720 shown in FIG. 7A. The illustrated smart entry detectors (e.g., sensors 710 and 720) may be disposed at one or more windows, doors, and other entry points of the smart home environment for detecting when a window, door, or other entry point is opened, broken, breached, and/or compromised. The smart entry detectors may generate a corresponding signal to be provided to the controller 730 and/or the remote system 740 when a window or door is opened, closed, breached, and/or compromised. In some embodiments of the disclosed subject matter, the alarm system, which may be included with controller 730 and/or coupled to the network 700 may not arm unless all smart entry detectors (e.g., sensors 710 and 720) indicate that all doors, windows, entryways, and the like are closed and/or that all smart entry detectors are armed.

The smart home environment of the sensor network shown in FIG. 7A can include one or more intelligent, multi-sensing, network-connected doorknobs (e.g., "smart doorknob"). For example, the sensors 710 and 720 may be coupled to a doorknob of a door (e.g., doorknobs located on external doors of the structure of the smart home environment). However, it should be appreciated that smart doorknobs can be provided on external and/or internal doors of the smart home environment.

The smart thermostats, the smart hazard detectors, the smart doorbells, the smart wall switches, the smart wall plugs, the smart entry detectors, the smart doorknobs, the keypads, and other devices of a smart home environment (e.g., as illustrated as sensors 710 and 720 of FIG. 7A) can be communicatively coupled to each other via the network 700, and to the controller 730 and/or remote system 740 to provide security, safety, and/or comfort for the smart home environment. Alternatively or in addition, each of the devices of the smart home environment may provide data that can be used to determine an occupancy and/or physical status of a premises, as well as data that may be used to determine an appropriate recipient of a notification, as previously disclosed herein.

A user can interact with one or more of the network-connected smart devices (e.g., via the network 700). For example, a user can communicate with one or more of the network-connected smart devices using a computer or mobile device (e.g., a desktop computer, laptop computer, tablet, or the like) or other portable electronic device (e.g., a smartphone, a tablet, a key FOB, or the like). A webpage or application can be configured to receive communications from the user and control the one or more of the network-connected smart devices based on the communications and/or to present information about the device's operation to the user. For example, the user can view, arm or disarm the security system of the home.

One or more users can control one or more of the network-connected smart devices in the smart home environment using a network-connected computer or portable electronic device. In some examples, some or all of the users (e.g., individuals who live in the home) can register their mobile device and/or key FOBs with the smart home environment (e.g., with the controller 730). Such registration can be made at a central server (e.g., the controller 730 and/or the remote system 740) to authenticate the user and/or the electronic device as being associated with the smart home environment, and to provide permission to the user to use the electronic device to control the network-connected smart devices and systems of the smart home environment. A user can use their registered electronic device to remotely control the network-connected smart devices and systems of the smart home environment, such as when the occupant is at work or on vacation. The user may also use their registered electronic device to control the network-connected smart devices when the user is located inside the smart home environment.

Alternatively, or in addition to registering electronic devices, the smart home environment may make inferences about which individuals live in the home (occupants) and are therefore users and which electronic devices are associated with those individuals. As such, the smart home environment may "learn" who is a user (e.g., an authorized user) and permit the electronic devices associated with those individuals to control the network-connected smart devices of the smart home environment (e.g., devices communicatively coupled to the network 700) in some embodiments, including sensors used by or within the smart home environment. Various types of notices and other information may be provided to users via messages sent to one or more user electronic devices. For example, the messages can be sent via email, short message service (SMS), multimedia messaging service (MMS), unstructured supplementary service data (US SD), as well as any other type of messaging services and/or communication protocols. As previously described, such notices may be generated in response to specific determinations of the occupancy and/or physical status of a premises, or they may be sent for other reasons as disclosed herein.

A smart home environment may include communication with devices outside of the smart home environment but within a proximate geographical range of the home. For example, the smart home environment may include an outdoor lighting system (not shown) that communicates information through the communication network 700 or directly to a central server or cloud-computing system (e.g., controller 730 and/or remote system 740) regarding detected movement and/or presence of people, animals, and any other objects and receives back commands for controlling the lighting accordingly.

The controller 730 and/or remote system 740 can control the outdoor lighting system based on information received from the other network-connected smart devices in the smart home environment. For example, in the event that any of the network-connected smart devices, such as smart wall plugs located outdoors, detect movement at nighttime, the controller 730 and/or remote system 740 can activate the outdoor lighting system and/or other lights in the smart home environment.

In some configurations, a remote system 740 may aggregate data from multiple locations, such as multiple buildings, multi-resident buildings, individual residences within a neighborhood, multiple neighborhoods, and the like. In general, multiple sensor/controller systems 750 and 760 as shown FIG. 7B may provide information to the remote system 740. The systems 750 and 760 may provide data directly from one or more sensors as previously described, or the data may be aggregated and/or analyzed by local controllers such as the controller 730, which then communicates with the remote system 740. The remote system may aggregate and analyze the data from multiple locations, and may provide aggregate results to each location. For example, the remote system 740 may examine larger regions for common sensor data or trends in sensor data, and provide information on the identified commonality or environmental data trends to each local system 750 and 760. Aggregated data may be used to generate appropriate notices and/or determine appropriate recipients for such notices as disclosed herein. For example, the remote system 740 may determine that the most common user response to a notification that a garage door has been left open while a security component of the smart home environment is in an armed state, is that the user returns to the premises and closes the garage door. Individual smart home systems and/or controllers as previously disclosed may receive such data from the remote system and, in response, set a default action of closing the garage door when the system determines that an armed state has been set and the garage door has been left open for more than a minimum threshold of time. The data provided to the individual systems may be only aggregate data, i.e., such that no individual information about any one other smart home environment or type of smart home environment is provided to any other. As another example, the remote system may receive data from multiple premises in a particular geographic region, indicating that it is raining in the region, and that the rain is moving east (based on the times at which the data indicating rainfall is received from different premises). In response, the remote system may provide an indication to premises further to the east that rain may be expected. In response, notifications may be provided to occupants of the individual premises that rain is expected, that particular windows should be closed, or the like. In some configurations users may be provided with the option of receiving such aggregated data, and/or with the option of providing anonymous data to a remote system for use in such aggregation. In some configurations, aggregated data also may be provided as "historical" data as previously disclosed. Such data may be used by a remote system and/or by individual smart home environments to identify trends, predict physical statuses of a premises, and the like.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Figure 8:
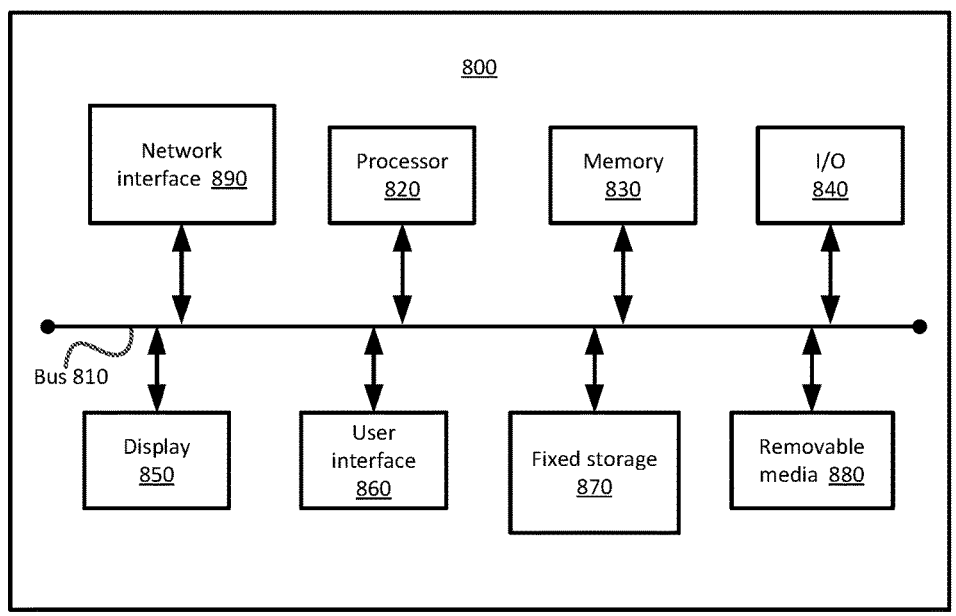
FIG. 8 shows a computing device according to an implementation of this disclosure.

Embodiments of the presently disclosed subject matter may be implemented in and used with a variety of computing devices. FIG. 8 is an example of a computing device 800 suitable for implementing embodiments of the disclosed subject matter. For example, the computing device 800 may be used to implement a controller, a premises management system, a device including sensors as disclosed herein, or the like. Alternatively or in addition, the device 800 may be, for example, a desktop or laptop computer, or a mobile computing device such as a smart phone, tablet, or the like. Computing device 800 may include a bus 810 which interconnects major components of the computing device 800, such as a central processor 820, memory 830 such as Random Access Memory (RAM), Read Only Memory (ROM), flash RAM, or the like, a user display 850 such as a display screen, a user interface 860, which may include one or more controllers and associated user input devices such as a keyboard, mouse, touch screen, and the like, a fixed storage 870 such as a hard drive, flash storage, and the like, a removable media component 880 operative to control and receive an optical disk, flash drive, and the like, and a network interface 890 operable to communicate with one or more remote devices via a suitable network connection.

The bus 810 allows data communication between the central processor 820 and one or more memory components 830 and 870, which may include RAM, ROM, and other memory, as previously noted. Applications resident with the computing device 800 are generally stored on and accessed via a non-transitory, computer-readable storage medium, such as memory 830 or fixed storage 870.

The fixed storage 870 may be integral with the computing device 800 or may be separate and accessed through other interfaces. The network interface 890 may provide a direct connection to a remote server via a wired or wireless connection. The network interface 890 may provide such connection using any suitable technique and protocol as will be readily understood by one of skill in the art, including digital cellular telephone, Wi-Fi, Bluetooth(R), near-field, and the like. For example, the network interface 890 may allow the device to communicate with other computers via one or more local, wide-area, or other communication networks, as described in further detail herein.

Figure 9:
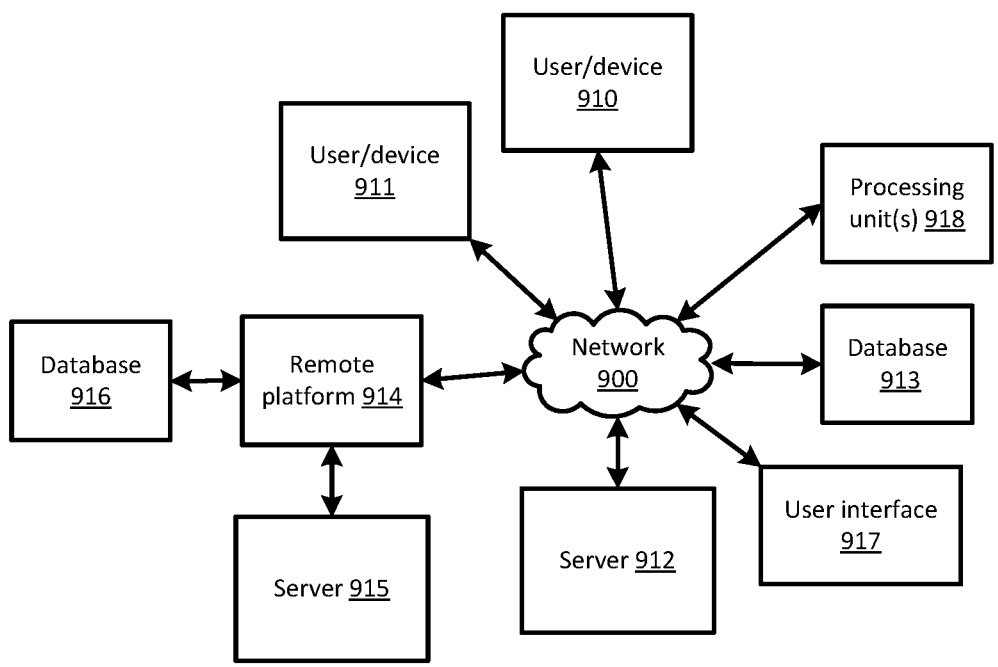
FIG. 9 shows a networked arrangement according to an implementation of this disclosure.

FIG. 9 shows an example network arrangement 900 according to an embodiment of the disclosed subject matter. One or more devices 910, 911, such as local computers, smart phones, tablet computing devices, or sensors such as that described above with respect to FIGS. 5A and 5B, and the like may connect to other devices via one or more networks 900. Each device may be a computing device or in communication with a computing device as previously described. The network 900 may be a local network, wide-area network, the Internet, or any other suitable communication network or networks, and may be implemented on any suitable infrastructure, including wired and/or wireless networks. The devices may communicate with one or more remote systems, such as servers 912, 915 and/or databases 913, 916 implemented on computing devices. Remote systems may be directly accessible by the devices 910, 911. For example, processing units 918 may provide cloud-scale processing and data analytics, such as neural network analysis for providing sound and image recognition services. In other embodiments, one or more other devices may provide intermediary access such as where remote platform 914 provides access to resources stored in a database 916 or cloud computing services and/or storage services from server 915. Remote systems may provide additional functionality to devices 910, 911, such as user interface functionality 917.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A device comprising:
   a first infrared sensor;
   a second infrared sensor distinct from the first infrared sensor;
   a first detection component;
   a first temperature signal path connecting the first detection component and the first infrared sensor;
   a second temperature signal path connecting the first detection component and the second infrared sensor;
   a second detection component;
   a first occupancy signal path connecting the second detection component and the first infrared sensor; and
   a second occupancy signal path connecting the second detection component and the second infrared sensor.

2. The device of claim 1, wherein the first infrared sensor and the second infrared sensor are each passive infrared sensors.

3. The device of claim 1, wherein the first detection component comprises a circuit that averages a value of a signal from the first temperature signal path and a value of a signal from the second temperature signal path.

4. The device of claim 1, wherein the second detection component comprises a circuit that determines a difference of a value of a signal from the first occupancy signal path and a value of a signal from the second occupancy signal path.

5. The device of claim 1, wherein:
   the second detection component comprises a circuit that determines a difference of a value of a signal from the first occupancy signal path and a value of a signal from the second occupancy signal path; and
   the second detection component generates an occupancy signal when the difference exceeds a threshold value.

6. The device of claim 1, wherein:
   the first detection component comprises a circuit that averages a value of a first signal from the first temperature signal path and a value of a second signal from the second temperature signal path; and
   the second detection component comprises a circuit that determines a difference of the value of the first signal from the first occupancy signal path and the value of the second signal from the second occupancy signal path.

7. The device of claim 1, wherein the first temperature signal path, the first occupancy signal path, the second temperature signal path, and the second occupancy signal path are disposed on a single circuit board.

8. The device of claim 1, wherein the first temperature signal path and the first occupancy signal path combine into a single signal path before connecting to the first infrared sensor.

9. The device of claim 8, wherein:
the second temperature signal path and the second occupancy signal path combine into a single signal path before connecting to the second infrared sensor.

10. A system comprising:
a first infrared sensor;
a second infrared sensor distinct from the first infrared sensor;
a processor in communication with the first infrared sensor and the second infrared sensor; and
a non-transitory, computer-readable medium in communication with the processor and storing instructions that, when executed by the processor, cause the processor to perform operations comprising:
receiving, from the first infrared sensor, a first signal,
receiving, from the second infrared sensor, a second signal,
determining, based on the first signal and the second signal, a temperature measurement; and
determining, based on a difference of a value of the first signal and the second signal, an occupancy measurement.

11. The system of claim 10, wherein the determination of the temperature measurement occurs, at least in part, concurrently with the determination of the occupancy measurement.

12. The system of claim 10, wherein the operations further comprise providing to a system that is remote from the device, the temperature measurement and the occupancy measurement.

13. A method comprising:
capturing, by a first infrared sensor housed in a device, a first incident radiation;
capturing, by a second infrared sensor that is housed in the device and that is distinct from the first infrared sensor, a second incident radiation;
generating, by the first infrared sensor, a first signal in response to the first incident radiation;
generating, by the second infrared sensor, a second signal in response to the second incident radiation;
determining, by the device, a temperature measurement based on the first signal and the second signal;
determining, by the device, an occupancy measurement based on a difference of a value of the first signal and the second signal.

14. The method of claim 13, wherein the determination of the temperature measurement occurs, at least in part, concurrently with the determination of the occupancy measurement.

15. The method of claim 13, wherein the determination of the temperature measurement is based on a sum of a value of the first signal and a value of the second signal.

16. The method of claim 13, wherein the determination of the temperature measurement is based on an average of a value of the first signal and a value of the second signal.

17. The method of claim 13, wherein the determination of the temperature measurement comprises:
receiving, by a first detection component of the device, the first signal,
receiving, by the first detection component, the second signal, and
determining an average of a value of the first signal and a value of the second signal.

18. The method of claim 13, wherein the determination of the temperature measurement comprises:
receiving, by a first detection component of the device, the first signal,
receiving, by the first detection component, the second signal, and
determining an average of a value of the first signal and a value of the second signal; and
wherein the determination of the occupancy measurement comprises:
receiving, by a second detection component of the device, the first signal,
receiving, by the second detection component, the second signal, and
determining, at least in part concurrently with the determination of the temperature measurement, a difference of the value of the first signal and the value of the second signal.

19. The method of claim 13, further comprising, providing to a system that is remote from the device, the temperature measurement and the occupancy measurement.

* * * * *